Figure 1:
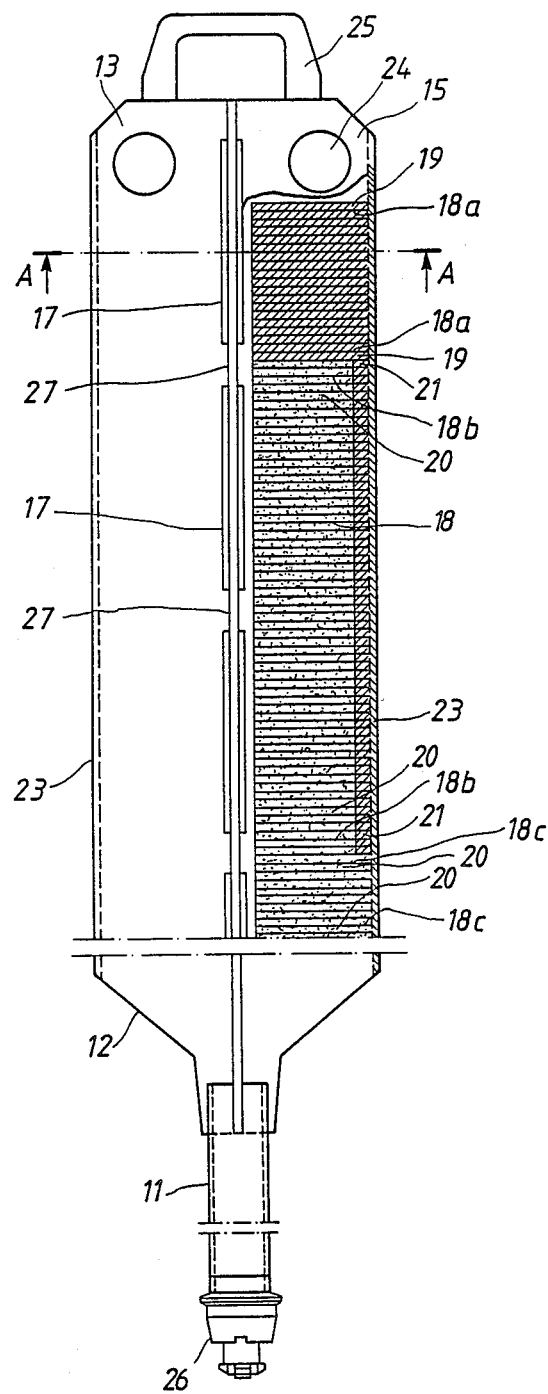

United States Patent [19]

Vesterlund

[11] Patent Number: 4,888,150

[45] Date of Patent: Dec. 19, 1989

[54] CONTROL ROD FOR NUCLEAR REACTORS

[75] Inventor: Gunnar Vesterlund, Västeras, Sweden

[73] Assignee: ABB Atom AB, Vasteras, Sweden

[21] Appl. No.: 291,254

[22] Filed: Dec. 28, 1988

[30] Foreign Application Priority Data

Jan. 11, 1988 [SE] Sweden ............................... 8800048

[51] Int. Cl.[4] .............................................. G21C 7/10
[52] U.S. Cl. .................................................... 376/333
[58] Field of Search ................................ 376/327, 333

[56] References Cited

U.S. PATENT DOCUMENTS 3,448,008 6/1969 Hellman ............................... 376/333
4,752,440 6/1988 Ahlinder et al. ..................... 376/333

Primary Examiner—Harvey E. Behrend
Attorney, Agent, or Firm—Watson, Cole, Grindle & Watson

[57] ABSTRACT

A control rod for a nuclear reactor comprising a number of absorber plates (13-16) which are connected to each other along a center line on the control rod and which are each provided with a plurality of bored channels (18b), which extend at least substantially perpendicularly to the center line of the rod, contain boron carbide or other absorber material which swells upon irradiation and are sealed off from communication with the surroundings of the control rod. Within at least one region of an absorber plate, each channel is arranged at a smaller distance to an adjacent channel than to the surface of the absorber plate. Preferably, each channel within the stated region of the absorber plate is arranged at a smaller distance to the adjacent channel on one of its sides than to the adjacent channel on its other side.

3 Claims, 2 Drawing Sheets

A-A

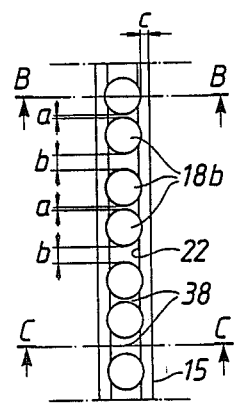
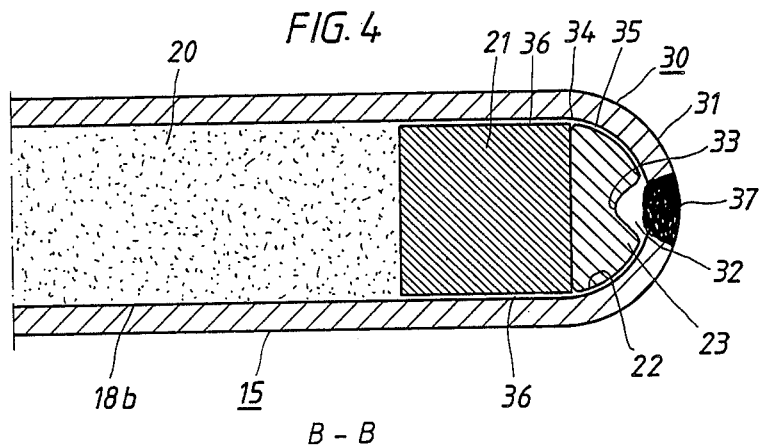
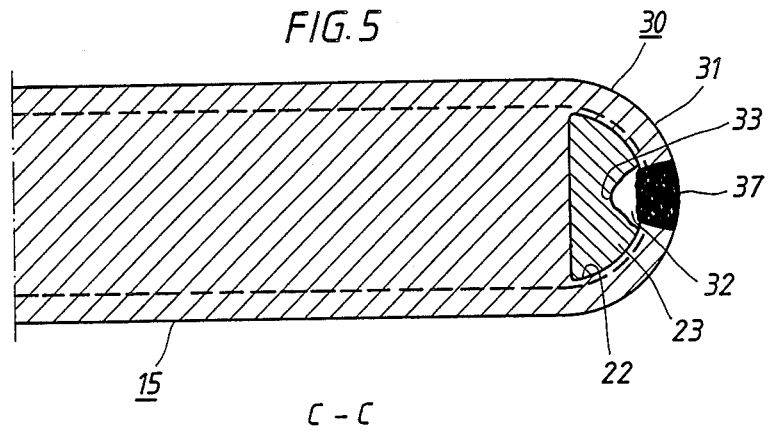

CONTROL ROD FOR NUCLEAR REACTORS

The present invention relates to a control rod for nuclear reactors, which comprises a number of absorber plates which are connected to each other along a centre line of the rod and which are each provided with a plurality of bored channels, which extend at least substantially perpendicularly to the centre line of the rod, contain boron carbide or other absorber material which swells upon irradiation and are sealed off from communication with the environment of the control rod.

A control rod of the above-mentioned kind is known from U.S. Pat. No. 3,448,008 (Hellman). Each absorber blade in this control rod is provided with an edge portion, parallel to the centre line of the rod, in which is arranged an elongated space which is in open communication with and allows a gas flow between the different channels. At the edge facing away from the centre line of the control rod, the edge portion comprises an outwardly closed slot in the absorber plate, in which a longitudinal bar is arranged to make contact with the orifices of the channels at the bottom of the slot.

When boron carbide is subjected to neutron irradiation, helium gas is formed. Since absorber plates in a control rod are not subjected to uniform irradiation, the developed amount of gas is different in different channels with absorber material. In the above-described known control rod, an equalization of the gas pressure arising in the different channels is achieved since—as mentioned—the channels are sealed by means of an edge portion which allows a gas flow between the different channels.

The neutron irradiation of the boron carbide also results in the boron carbide swelling. This swelling of the absorber material in a channel may cause stress corrosion in the construction material around the channel which surrounds the absorber material, i.e. in the material from which the control rod is manufactured. The risk of cracks in the construction material caused by stress corrosion increases with increased irradiation and with increased swelling of the absorber material. If a crack arises in a channel, a transport of boron carbide, which is in powdered form in the known case, takes place from the space of the channel, so that the channel is depleted of boron carbide. In addition, a transport of absorber material occurs in the described control rod from other adjacently located undamaged channels, especially in the region positioned nearest to the edge portion, because the edge portion does not effectively prevent the transport of liquid from the defective channel to an undamaged channel and the transport of liquid together with absorber material from an undamaged channel to the defective one and from there to the environment. These processes, caused by the swelling of the absorber material, are described in U.S. patent apliction Ser. No. 071,590 (Ahlinder et al). To counteract the described processes, a body of hafnium or other metallic absorber material is arranged outside the boron carbide or other powdered absorber material in the outwardly-facing part of a channel. This body forms between it and the inner wall of the channel a gap which allows the passage of gas but prevents the passage of powdered absorber material from the channel.

The present invention also relates to measures for counteracting harmful processes, which are associated with the swelling of an absorber material in a bored channel and with stress corrosion, arising in connection therewith, in the construction material around the channel. The invention is based on the realization that the harmful processes mentioned above can be counteracted by utilizing the property of the absorber plate that its inner parts are not subjected to the influence of a corrosive environment in comparison with what is the case with its superficially located parts. The measures taken according to the invention comprise arranging each channel, at least within that region of an absorber plate where the described harmful processes occur, with absorber material at a smaller distance to an adjacent channel than to the surface of the absorber plate. In this way, the swelling of the boron carbide is taken up by construction material which is not in contact with the corrosive medium, which minimizes the risk of the formation of cracks in the construction material around the channel.

It is also possible to arrange a channel at such a small distance to an adjacent channel, i.e. make the partition between them so thin, that it is thereby ensured that the swelling of the absorber material gives rise to a strain and accomodation of the swelling of the boron carbide in this partition before any significant strain arises in other parts of the construction material around the channel. The distance between the channel and an adjacent channel should then be smaller than half of the distance between the channel and the surface of the absorber plate.

More particularly, when characterizes the control rod according to the present invention is that, within at least one region of an absorber plate with channels, each channel is arranged at a smaller distance to an adjacent channel than to the surface of the absorber plate.

According to an advantageous embodiment of the invention, each channel, within the stated region of the absorber plate, is arranged at a smaller distance to the adjacent channel on one of its sides than to the adjacent channel on its other side, i.e. the channels are arranged side-by-side in pairs. With this embodiment the following advantages are obtained: the swelling of the absorber material is taken up in the favourable manner described above, the quantity of absorber material can be adapted to an optimum value, and the absorber blades can be given the necessary mechanical stiffness. However, it is possible, per se, to arranged more than two of the channels side-by-side, for example three and three or four and four.

The construction material in the absorber plates preferably consists of stainless steel, for example SIS 2352 (corresponding to Werkstoffnummer 1.4306 and DIN 17440) or SIS 2353 (corresponding to Werkstoffnummer 1.4435 and DIN 17443), but may also consist of other materials, such as INCONEL 600 or any other nickel-based alloy.

Figure 2:
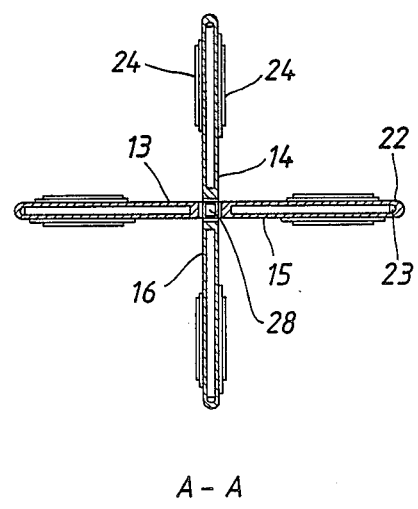

The invention will be described in greater detail, by way of example, with reference to the accompanying drawing, wherein FIG. 1 shows a side view, partially in section, of a control rod according to the invention, FIG. 2 shows a cross-section of a control rod according to the invention, FIG. 3 shows a cross-section, parallel to the centre line of the control rod, of an absorber plate inside the edge of the plate facing away from the control rod, and FIGS. 4 and 5 show two sections perpendicular thereto.

The control rod shown in FIGS. 1 and 2 is mainly made of stainless steel and consists of an absorber part 12 supported by a vertically arranged coupling bar 11. The absorber part 12 consists of four absorber plates 13–16, which form a rectilinear cross, the centre line of which coincides with that of the coupling bar 11. The absorber plates are provided at the centre with recesses 17 and projections 27 and are welded to each other at the projections 27 and at a supporting block 28 with square cross-section arranged adjacent the projections 27. The plates, which have a thickness of 8 mm, are provided with a large number of bored channels 18 (18a–c) with a diameter of 6 mm and a depth of 100 mm. In order to make FIG. 1 more clear, the channels therein are drawn without the distances which in reality exist between them, as will also be clear from the following. The uppermost channels 18a, which are most subjected to radiation, are filled with rods of hafnium metal of the same length as the channels. Hafnium does not swell upon irradiation. The channels 18b arranged below channels 18a are filled with powdered boron carbide 20 with the exception of the outermost part which is filled with a circular-cylindrical body 21 of hafnium metal. The body 21 has a diameter which is somewhat smaller than the diameter of the channel. The channels 18c arranged at the bottom, where the irradiation is lowest, are completely filled with powdered boron carbide 20 of the kind mentioned above. The distance between the envelope surfaces on two adjacent channels of types 18a and 18c is at all places 2 mm. For each channel 18b, the distance to the adjacent channel on one of its sides is 0.4 mm (the distance designated a in FIG. 3), and the distance to the adjacent channel on the other side is 3.6 mm (the distance designated b in FIG. 3). The edge of each absorber plate facing away from the centre line of the rod is provided with a slot 22, in which a bar 23 is arranged. At least in its upper part the bar 23 is suitably of hafnium metal. It may also in its entirety, and at least in the lower part, be of, for example, stainless steel. The application of the bar 23 in the slot 22 and the sealing of the slot 22 are described in greater detail below with reference to an explanation of FIGS. 3–5. For guiding of the control rod in the relatively narrow gaps between the fuel boxes of the reactor, the upper part of the control rod is provided with guide pads 24 of Inconel. In addition, it is provided with a lifting handle 25 for handling the rod during insertion and replacement. At its lower part, the rod is provided with a coupling head 26 over which the rod can be connected to a drive mechanism (control device).

FIG. 3 shows a number of channels 18b in the absorber plate 15 as well as the slot 22, which in the exemplified case has a width of 5.5 mm in its entire length. From the information given above concerning the thickness of the absorber plate 15, the diameter of the channels 18, and the distances a and b between different channels of type 18b, it is clear that for each channel 18b the distance (a) from its envelope surface to the envelope of an adjacent channel is smaller than the distance (c) from its envelope surface to the surface of the absorber blade. As will be more clear from FIGS. 4 and 5, the absorber plate 15 has an edge portion 30, which comprises a gas-tight edge 31, a longitudinal space 32 located inside that edge, and a longitudinal bar 23 located in the slot 22 and having the same width as the slot 22 and being provided with a longitudinal indentation 33 which constitutes a limiting wall for the space 32. The bar 23 does not completely cover the orifices 34 of the channels in the bottom of the slot 22 as its width is smaller than the diameter of the channels, which, as mentioned above, amounts to 6 mm in the exemplified case. This leads to the creation of a gap 35 between the bar 23 and the side walls of the slot 22, where the channels are located, by the side walls of the slot 22 making contact with the bar 23 in the portions 38 (FIG. 3) where no channels are bored and, consequently, the side walls of the slot 22 are thicker. The channels 18b, as well as the channels 18a and 18c, are in open communication with the space 32 via the gaps 35, so that gas formed upon irradiation of the powdered absorber material may flow between the different channels in the plate 15 and pressure equilization be achieved. The gap 36 between the body 21 of hafnium metal and the inner wall of the channel 18b allows gas flow but prevents or radically counteracts a simultaneous transport of absorber material from the channel. In this way, a transport of absorber material from an undamaged channel to a channel exhibiting a crack, and through there to the surroundings of the control rod, is prevented or counteracted. Thus, the gap 36 (the distance between the inner wall of the channel 18b and the surface of body 21) is thinner than the gap 35 (the distance between the inner wall of channel 31 and the surface of bar 23 at the side of space 32) and, in addition, longer. The gap 36 is also thinner than the cross-section of the space 32, i.e. thinner than transport paths for the gas which are located in the edge portion.

In the manufacture of an absorber plate, the channels 18 are bored from an edge on a plane-parallel plate. Thereafter, the slot 22 is milled out. After filling the channels with absorber material, the bar 23 is applied in the slot 22 and the side walls of the slot 22, which are straight from the beginning, are pressed against the bar 23 and welded together at the end surfaces while forming a gas-tight edge 31. The welded joint is designated 37. Also at its ends at the top and bottom of the absorber plate, the slot 22 is sealed by welded joints.

The invention has been described in detail in connection with the use of boron carbide as swelling absorber material. The invention is also applicable to the use of other known absorber materials such as europium in the form of oxide or another compound. It is, of course, also applicable to control rods where no bodies 21 of hafnium are arranged in the outermost portions of certain absorber plates.

I claim:

1. A control rod for nuclear reactors, comprising a number of absorber plates (13–16) which are connected to each other along a centre line on the rod and which are each provided with a plurality of bored channels (18), which extend at least substantially perpendicularly to the centre line of the rod, contain boron carbide or other absorber material (20) which swells upon irradiation and are sealed off from communication with the surroundings of the control rod, characterized in that within at least one region of an absorber plate each channel (18b) is arranged at a smaller distance (a) to an adjacent channel than (c) to the surface of the absorber plate.

2. A control rod according to claim 1, characterized in that within at least the stated region of the absorber plate, each channel (18b) is arranged at a smaller distance (a) to the adjacent channel on one of its sides than (b) to the adjacent channel on its other side.

3. A control rod according to claim 1, characterized in that within at least the stated region of the absorber plate, each channel (18b) is arranged at a distance (a) to an adjacent channel which is smaller than half of the distance (c) to the surface of the absorber plate.

* * * * *